US012667983B2

(12) United States Patent (10) Patent No.: US 12,667,983 B2
Saito et al. (45) Date of Patent: Jun. 30, 2026

(54) EXTENSION AND CONTRACTION DEVICE

(71) Applicants: AKITA PREFECTURAL UNIVERSITY, Akita (JP); KYB Corporation, Tokyo (JP)

(72) Inventors: Takashi Saito, Yurihonjo (JP); Tatsuya Iizuka, Yurihonjo (JP); Kiriro Suzuki, Yurihonjo (JP); Kousei Sekino, Yurihonjo (JP); Yasushi Saitou, Nagano (JP); Takuya Arakawa, Nagano (JP)

(73) Assignees: AKITA PREFECTURAL UNIVERSITY, Akita (JP); KYB CORPORATION, Tokyo (JP)

( * ) Notice: Subject to any disclaimer, the term of this patent is extended or adjusted under 35 U.S.C. 154(b) by 167 days.

(21) Appl. No.: 18/556,565

(22) PCT Filed: Feb. 16, 2022

(86) PCT No.: PCT/JP2022/006262
§ 371 (c)(1),
(2) Date: Oct. 20, 2023

(87) PCT Pub. No.: WO2022/224565
PCT Pub. Date: Oct. 27, 2022

(65) Prior Publication Data
US 2024/0208083 A1 Jun. 27, 2024

(30) Foreign Application Priority Data
Apr. 23, 2021 (JP) ................................ 2021-073464

(51) Int. Cl.
B25J 18/00 (2006.01)
B25J 18/04 (2006.01)
B65H 75/44 (2006.01)

(52) U.S. Cl.
CPC .......... B25J 18/04 (2013.01); B65H 75/4484 (2013.01)

(58) Field of Classification Search
CPC . B25J 18/04; B25J 18/06; B25J 18/02; B65H 75/4484
See application file for complete search history.

(56) References Cited

U.S. PATENT DOCUMENTS 3,696,568 A * 10/1972 Berry ...................... E04C 3/005
52/108
5,718,087 A * 2/1998 Featherstone ......... E04H 12/182
52/118

(Continued)

FOREIGN PATENT DOCUMENTS

JP S50-38023 B1 12/1975
JP H06-263326 A 9/1994

(Continued)

*Primary Examiner* — Zakaria Elahmadi
(74) *Attorney, Agent, or Firm* — Rabin & Berdo, P.C.

(57) ABSTRACT

An extension and contraction device includes a tape driving device configured to perform winding up of the tape and delivery of the tape. The tape driving device has a reel around which the tape is wound, a motive-power source configured to perform the winding up of the tape onto the reel and the delivery of the tape from the reel, a band member in which a first end side is constrained and a second end side is a movable free end, the band member being provided along an outer circumferential surface of the tape wound around the reel in the roll shape, and the band member being configured to press the tape against the reel, and tension adjusting mechanism configured to adjust tension of the band member by regulating a position of the free end of the band member.

6 Claims, 11 Drawing Sheets

(56)                    References Cited

U.S. PATENT DOCUMENTS

|  |  |  |  |  |
|---|---|---|---|---|
| 7,891,145 B1 * | 2/2011 | Bobbio | ................. | E04H 12/185 |
|  |  |  |  | 242/379.2 |
| 2006/0261207 A1 * | 11/2006 | Woodruff | .............. | F16M 11/40 |
|  |  |  |  | 242/473.3 |
| 2014/0048672 A1 * | 2/2014 | Woodruff | .............. | F16M 11/18 |
|  |  |  |  | 248/404 |

FOREIGN PATENT DOCUMENTS

|  |  |  |  |  |  |
|---|---|---|---|---|---|
| JP | 2002323195 A | * | 11/2002 | .......... | F16H 19/064 |
| JP | 2009-196026 A |  | 9/2009 |  |  |
| JP | 2021-024057 A |  | 2/2021 |  |  |
| WO | WO-2008023718 A1 | * | 2/2008 | .......... | F16H 19/064 |

* cited by examiner

EXTENSION AND CONTRACTION DEVICE

TECHNICAL FIELD

The present invention relates to an extension and contraction device.

BACKGROUND ART

As an extension and contraction device having a high extension/contraction ratio and a sufficient strength, JP2009-196026A discloses a manipulator mechanism including a tape made of a spring steel and a delivery device that winds and delivers the tape.

SUMMARY OF INVENTION

In the extension and contraction device described in JP2009-196026A, the tape is wound around a reel in a roll shape, and the tape is wound up and delivered by rotating the reel. The tape is made of a metal or a synthetic resin having a spring characteristic and has an elastic force, and so, in a state in which the tape is wound around the reel in the roll shape, "unwinding, in which the wounded tapes are not maintained in a contact state with each other and a gap is formed between the tapes, tends to be caused.

An object of the present invention is to provide an extension and contraction device capable of preventing occurrence of unwinding of a tape.

Means for Solving the Problem

According to one aspect of the present invention, an extension and contraction device includes: a tape having an elasticity; and a tape driving device configured to perform winding up of the tape and delivery of the tape, wherein the tape driving device has: a reel around which the tape is wound in a roll shape; a motive-power source configured to perform the winding up of the tape onto the reel and the delivery of the tape from the reel; a band member in which a first end side is constrained and a second end side is a movable free end, the band member being provided along an outer circumferential surface of the tape wound around the reel in the roll shape, and the band member being configured to press the tape against the reel; and tension adjusting means configured to adjust tension of the band member by regulating a position of the free end of the band member.

DESCRIPTION OF EMBODIMENTS

In the following, an extension and contraction device 100 according to an embodiment of the present invention will be described with reference to the drawings.

Figure 1:
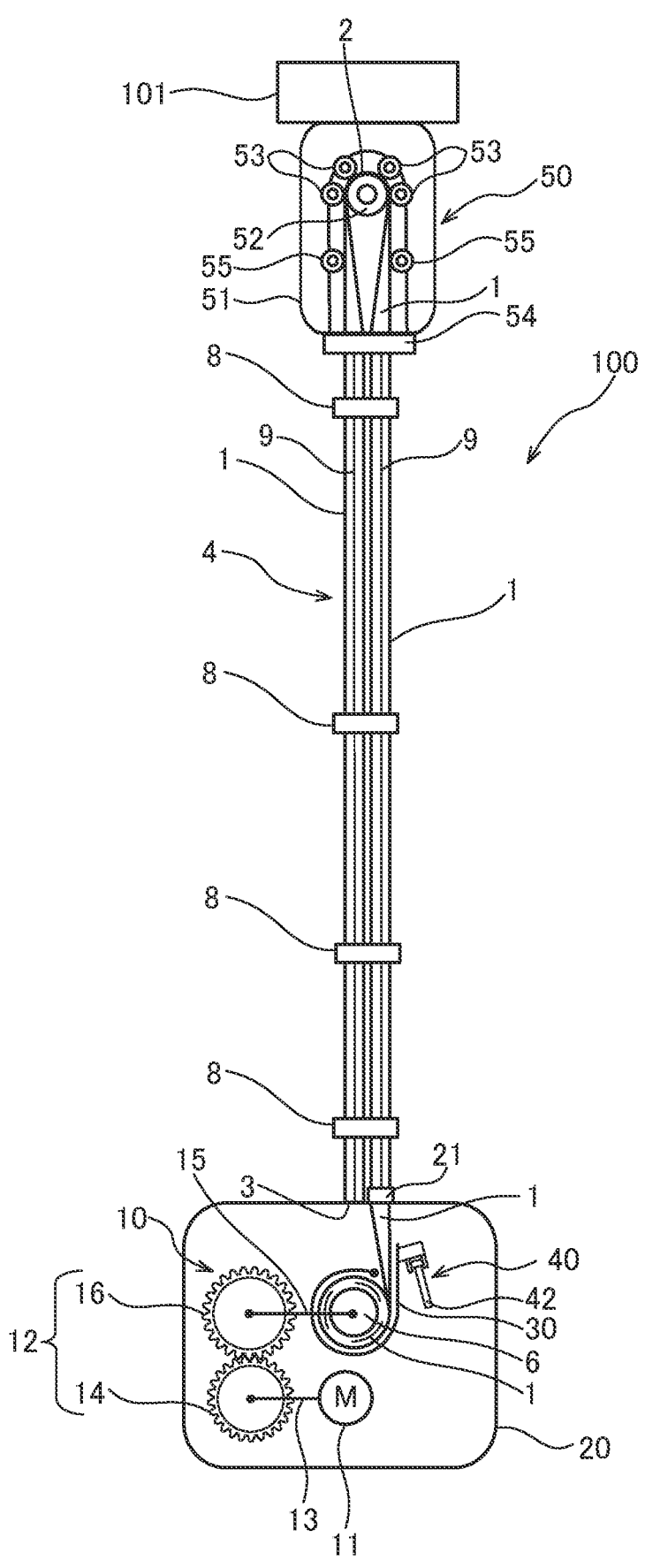
FIG. 1 is a schematic view of an extension and contraction device according to an embodiment of the present invention and shows a state in which an extension/contraction portion is most-extended.
Figure 2:
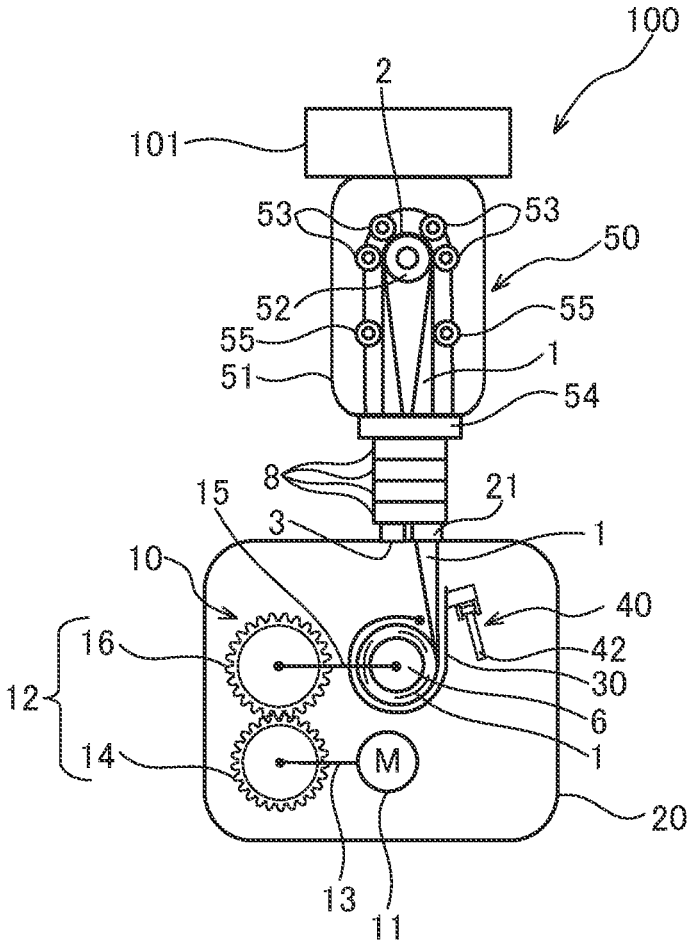
FIG. 2 is a schematic view of the extension and contraction device according to the embodiment of the present invention and shows a state in which the extension/contraction portion is most-contracted.

An overall configuration of the extension and contraction device 100 will be described with main reference to FIGS. 1 and 2. FIG. 1 is a schematic view of the extension and contraction device 100 in a state in which a tape 1 is extended, and FIG. 2 is a schematic view of the extension and contraction device 100 in a state in which the tape 1 is contracted.

The extension and contraction device 100 moves a driven object 101 by extending and contracting the tape 1 or supports an object with the tape 1.

As shown in FIG. 1, the extension and contraction device 100 includes the tape 1 having an elasticity and a tape driving device 10 that winds up the tape 1 and delivers the tape 1. The tape driving device 10 has a reel 6 around which the tape 1 is wound in a roll shape, a motor 11 serving as a motive-power source that winds up the tape 1 onto the reel 6 and delivers the tape 1 from the reel 6, and a housing 20 that accommodates the reel 6 and the motor 11.

The motor 11 is a servomotor with a built-in rotation angle detector and load detector. The rotation of the motor 11 is decelerated by a transmission mechanism 12 and is transmitted to the reel 6. The transmission mechanism 12 has a driving gear 14 that is linked to the motor 11 via a rotation shaft 13 and a driven gear 16 that is linked to the reel 6 via a rotation shaft 15 and engages with the driving gear 14. By driving the motor 11, the reel 6 is rotated via the transmission mechanism 12, and thereby, the winding up of the tape 1 onto the reel 6 and the delivery of the tape 1 from the reel 6 are performed. Specifically, the tape 1 is delivered from the reel 6 by driving the motor 11 in the normal direction, and the tape 1 is wound around the reel 6 by driving the motor 11 in the reverse direction. The housing 20 includes a tape guide 21 serving as an entrance and exit for the tape 1. The tape guide 21 is formed with a guide slit through which the tape 1 is slidably inserted and that guides entry/exit of the tape 1.

The tape 1 is made of a material having an elasticity, and in this embodiment, the tape 1 is made of a spring steel. The material of the tape 1 is not limited to the spring steel, and the tape 1 may be made of any material having a suitable spring characteristic and rigidity. The tape 1 may also be made of a synthetic resin or a composite material formed by combining the synthetic resin with fibers (carbon fibers, glass fibers) and/or a metal.

Figure 3:
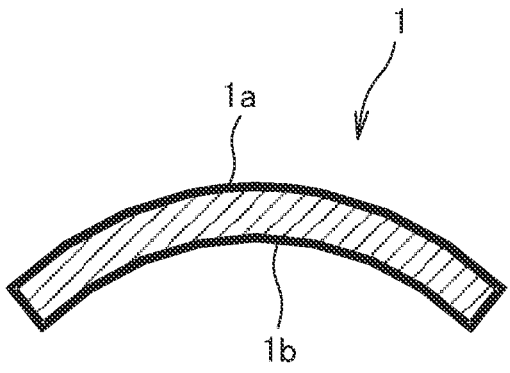
FIG. 3 is a cross-sectional view of a tape and is a diagram showing a cross-section perpendicular to the longitudinal direction of the tape.

The tape 1 has a strip shape and is formed to have a straight shape in the longitudinal direction in a state in which an external force is not applied. As shown in FIG. 3, the cross-section of the tape 1 in the width direction (the cross-section perpendicular to the longitudinal direction) is curved to have an arc shape with a convex surface 1a and a concave surface 1b. Because the tape 1 has an arc-shaped cross-section, the tape 1 exhibits a high rigidity against the external force in the longitudinal direction and is not bent easily. On the other hand, the tape 1 is bent when subjected to the external force in the direction perpendicular to the longitudinal direction and returns to the original straight shape elastically when the external force is removed.

The tape 1 that is wound around the reel 6 in the roll shape is wound by being bent in the direction in which the convex surface 1a faces outward. This is because the tape 1 having the arc-shaped cross-section is bent relatively easily in the direction in which the convex surface 1a faces outward, whereas a large force is required to bend the tape 1 in the direction in which the concave surface 1b faces outward.

The tape driving device 10 further has a belt 30 serving as a band member that presses the tape 1 that is wound around the reel 6 in the roll shape against the reel 6 and a tension adjusting mechanism 40 serving as tension adjusting means that adjusts the tension of the belt 30. The belt 30 and the tension adjusting mechanism 40 are provided also for preventing the unwinding of the tape 1 that is wound around the reel 6 in the roll shape. The belt 30 and the tension adjusting mechanism 40 will be described in detail below.

The extension and contraction device 100 further includes a turning device 50 that turns the tape 1 by 180 degrees. The tape 1 consists of a single continuous tape, and after being delivered from the tape driving device 10, the tape 1 is turned by 180 degrees by the turning device 50, and a tail end thereof is fixed to the housing 20 of the tape driving device 10. As described above, the tape 1 has a turned portion 2 and a fixed end 3. At the turned portion 2, similarly to the winding up onto the reel 6, the tape 1 is bent such that the convex surface 1a of the tape 1 faces outward. Therefore, the tape 1 is fed smoothly in the turning device 50.

As the tape 1 is delivered from the tape driving device 10, in response to a delivered amount of the tape 1, the turned portion 2 of the tape 1 is moved in the direction away from the fixed end 3 (the upward direction in FIG. 1). On the other hand, as the tape 1 is wound up by the tape driving device 10, in response to a wound amount of the tape 1, the turned portion 2 of the tape 1 is moved in the direction approaching the fixed end 3 (the downward direction in FIG. 1). As described above, for the tape 1, the turned portion 2 functions as a free end, and the length between the turned portion 2 and the fixed end 3 is changed as the tape driving device 10 is driven. In other words, a portion of the tape 1 extending from the tape guide 21 to the fixed end 3 via the turned portion 2 functions as an extension/contraction portion 4 that is extended and contracted as the tape driving device 10 is driven. Because the driven object 101 is attached to a case 51 of the turning device 50, the driven object 101 can be moved by extending and contracting the extension/contraction portion 4.

Because the extension/contraction portion 4 has the turned portion 2 that is formed at a tip end by turning the tape 1 by 180 degrees and the fixed end 3 at which the tail end of the tape 1 is fixed, the extension/contraction portion 4 is formed to have a double layer configuration in which two layers of the tape 1 are overlapped with each other. Therefore, for example, when the tape 1 is delivered from the tape driving device 10 by 1 m, the driven object 101 is moved upward by 0.5 m in FIG. 1, and when the tape 1 is wound up by the tape driving device 10 by 1 m, the driven object 101 is moved downward by 0.5 m in FIG. 1. Because the extension/contraction portion 4 is formed to have the double layered tape 1, the rigidity in the longitudinal direction is increased, and thus, it is possible to drive the tape driving device 10 while supporting the driven object 101 having a heavy weight.

Figure 4:
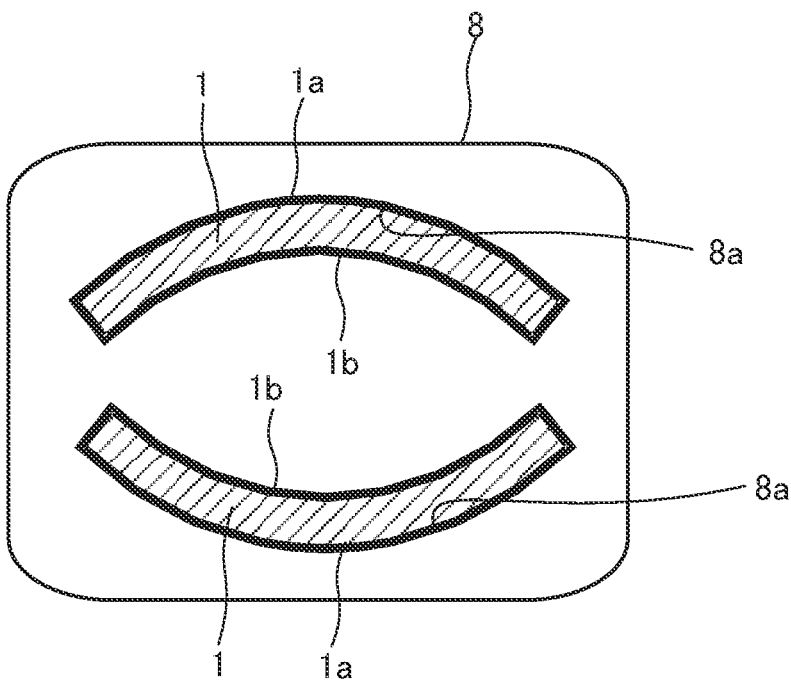
FIG. 4 is a plan view of a binding plate.

The extension/contraction portion 4 includes a plurality of binding plates 8 that are arranged with gaps therebetween in the longitudinal direction and respectively bind the two tapes 1. As shown in FIG. 4, the two tapes 1 are bound by the binding plates 8 such that respective concave surfaces 1b face each other. The binding plates 8 are each formed with two arc-shaped guide slits 8a having a similar shape to the external shape of the tape 1 with a size slightly larger than that of the external shape of the tape 1. The tape 1 is slidably inserted through the guide slits 8a, and when the extension/contraction portion 4 is extended/contracted, the tape 1 is fed by being guided by the guide slits 8a. In order to allow a smooth movement of the tape 1 along the guide slits 8a, bearings for guiding the tape 1 may be provided on inner circumferential surfaces of the guide slits 8a.

As shown in FIG. 1, the adjacent binding plates 8 are linked with each other by strings 9, and the gap between the adjacent binding plates 8 is set by the lengths of the strings 9 linking the adjacent binding plates 8. The binding plate 8 that is closest to the turning device 50 (the top binding plate 8 in FIG. 1) is attached to the case 51 of the turning device 50 by the strings 9. In addition, the binding plate 8 that is closest to the tape driving device 10 (the bottom binding plates 8 in FIG. 1) is attached to the housing 20 by the strings 9. As described above, the strings 9 are attached across the turning device 50 and the housing 20 to support the plurality of binding plates 8. A state in which the strings 9 are fully tensioned over the entirety is a most-extended state of the extension/contraction portion 4 (the state shown in FIG. 1). A rope or wire may also be used instead of the string 9.

The tape 1 at the extension/contraction portion 4 is supported by the plurality of binding plates 8, and thereby, buckling of the tape 1 due to the external force is prevented. Even if excessive external force is applied to the extension/contraction portion 4 of the tape 1 to cause the buckling at a part of the extension/contraction portion 4, as the external force is removed, the tape 1 returns to its original straight shape by the elastic force thereof. The adjacent binding plates 8 are arranged such that the gaps therebetween are increased gradually from the fixed end 3, which is a base end portion of the extension/contraction portion 4, towards the turned portion 2, which is the tip end. The adjacent binding plates 8 are arranged as described above because the greater load is applied to the extension/contraction portion 4 towards the base end side. The number of the binding plates 8 and the distance between the adjacent binding plates 8 are set in consideration of the length of the extension/contraction portion 4, the weight of the driven object 101, the application of the extension and contraction device 100, the rigidity of the tape 1, and so forth.

The turning device 50 has the case 51, a direction changing roller 52 that is provided in the case 51 so as to be rotatable and changes the running direction of the tape 1 by 180 degrees, a plurality of guide rollers 53 that press the tape 1 against the direction changing roller 52, and a tape guide 54 that is provided at the case 51 and guides the entry/exit of the tape 1 to/from the case 51.

The tape guide 54 is formed with two arc-shaped guide slits through which the tape 1 is slidably inserted such that the tape 1 is guided by the guide slits. The shape of the two guide slits is the same as that of the two guide slits 8a formed in each of the binding plates 8 as shown in FIG. 4.

The tape 1 that has entered inside the case 51 from the tape guide 54 is fed along an outer circumferential surface of the direction changing roller 52 in a substantially flat state by being gradually deformed from the arc-shaped cross-section to the rectangular cross-section along a path from the tape guide 54 to the direction changing roller 52. The tape 1 is then gradually deformed from the rectangular cross-section to the arc-shaped cross-section along a path from the direction changing roller 52 to the tape guide 54. As described above, the running direction of the tape 1 is changed smoothly by the direction changing roller 52. A portion of the tape 1 between the tape guide 54 and the direction changing roller 52 is a shape transition zone along which the cross-sectional shape thereof is changed gradually. The rigidity of the tape 1 in the shape transition zone is relatively lower than other portions, and so, the tape 1 is easily be buckled. Therefore, in order to prevent the buckling of the tape 1 in the shape transition zone, it is preferable to provide guide rollers 55 that guide running of the tape 1 in the shape transition zone.

Figure 5:
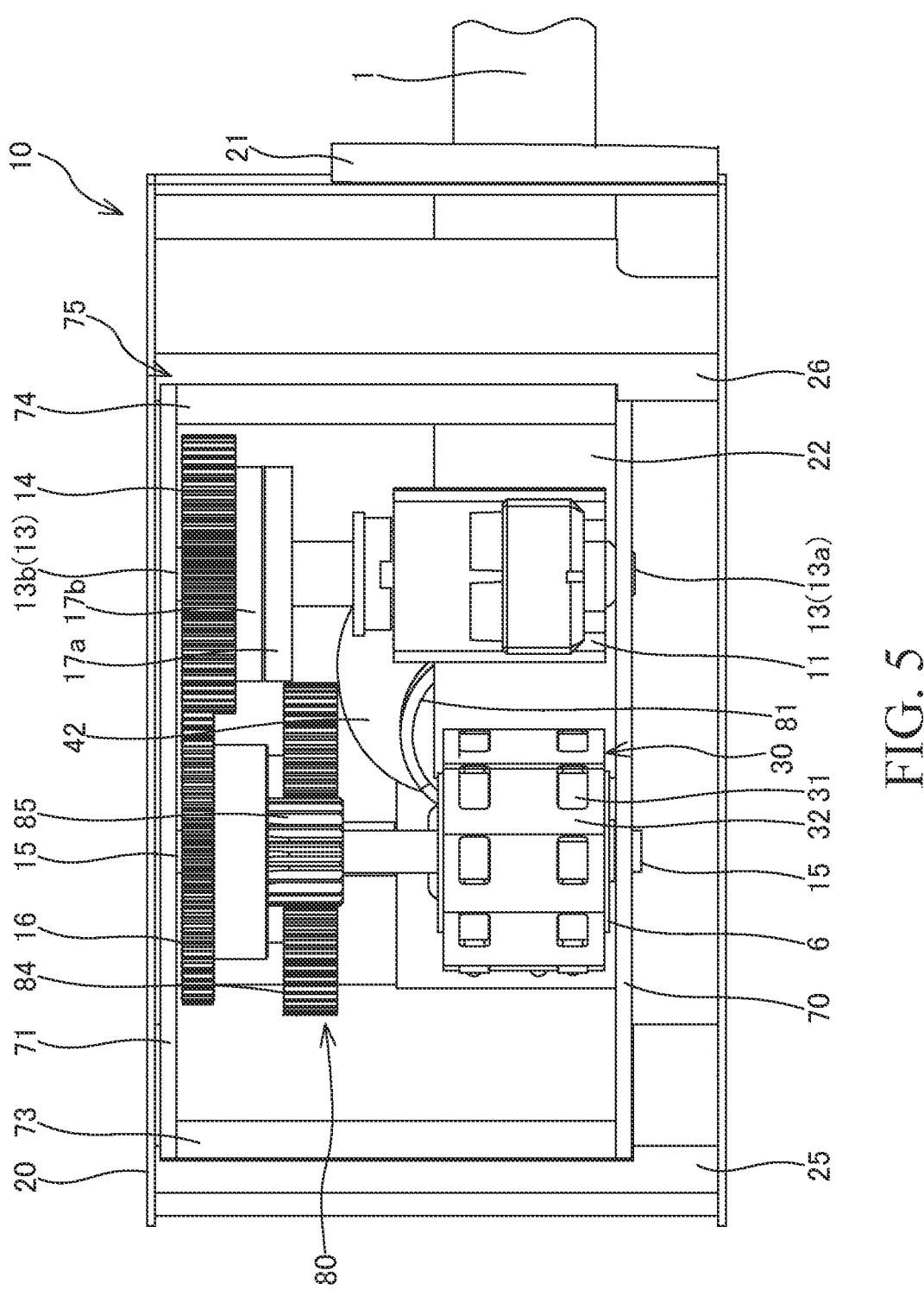
FIG. 5 is a plan view of a tape driving device of the extension and contraction device according to the embodiment of the present invention.
Figure 6:
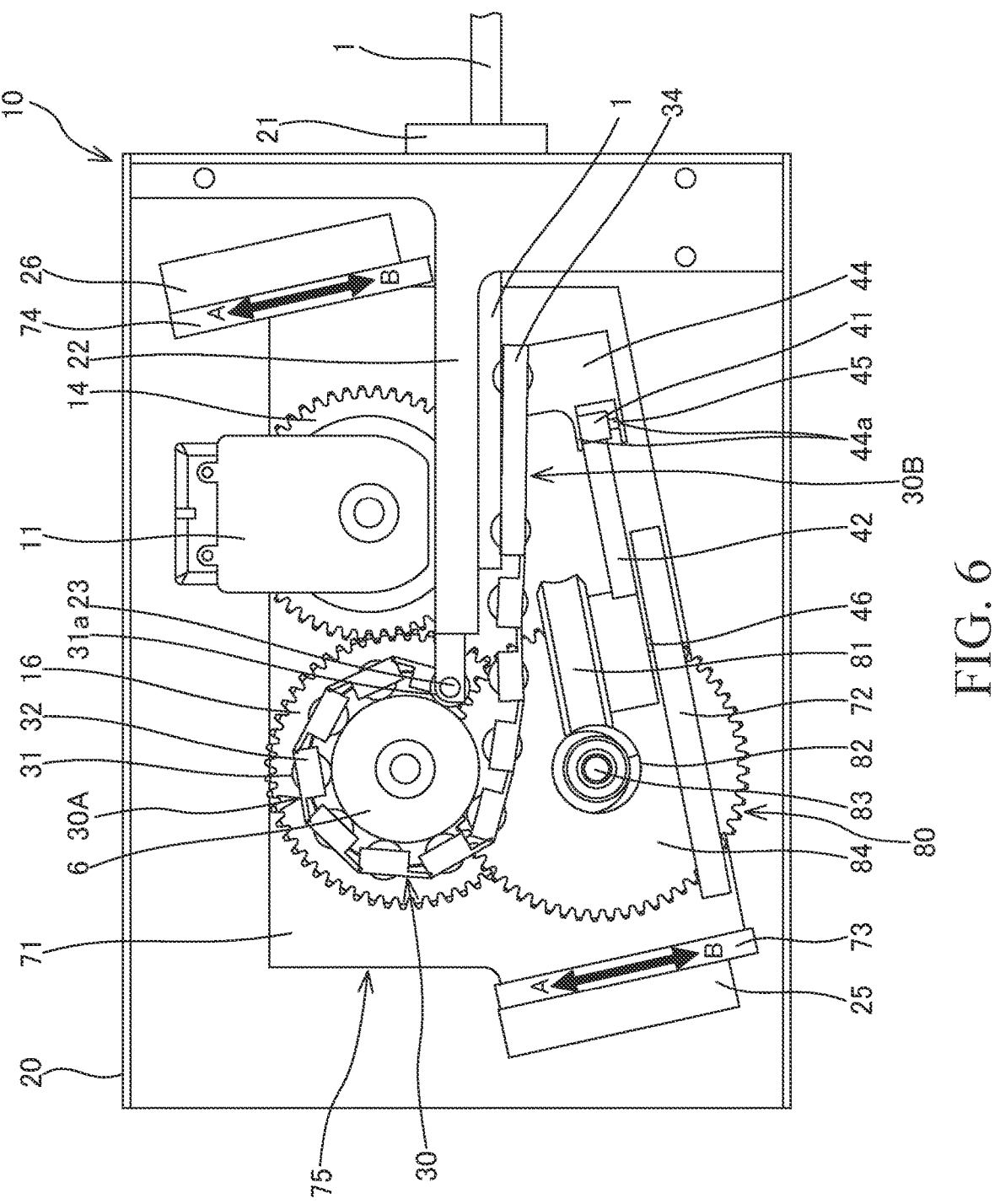
FIG. 6 is a side view of the tape driving device of the extension and contraction device according to the embodiment of the present invention.
Figure 7:
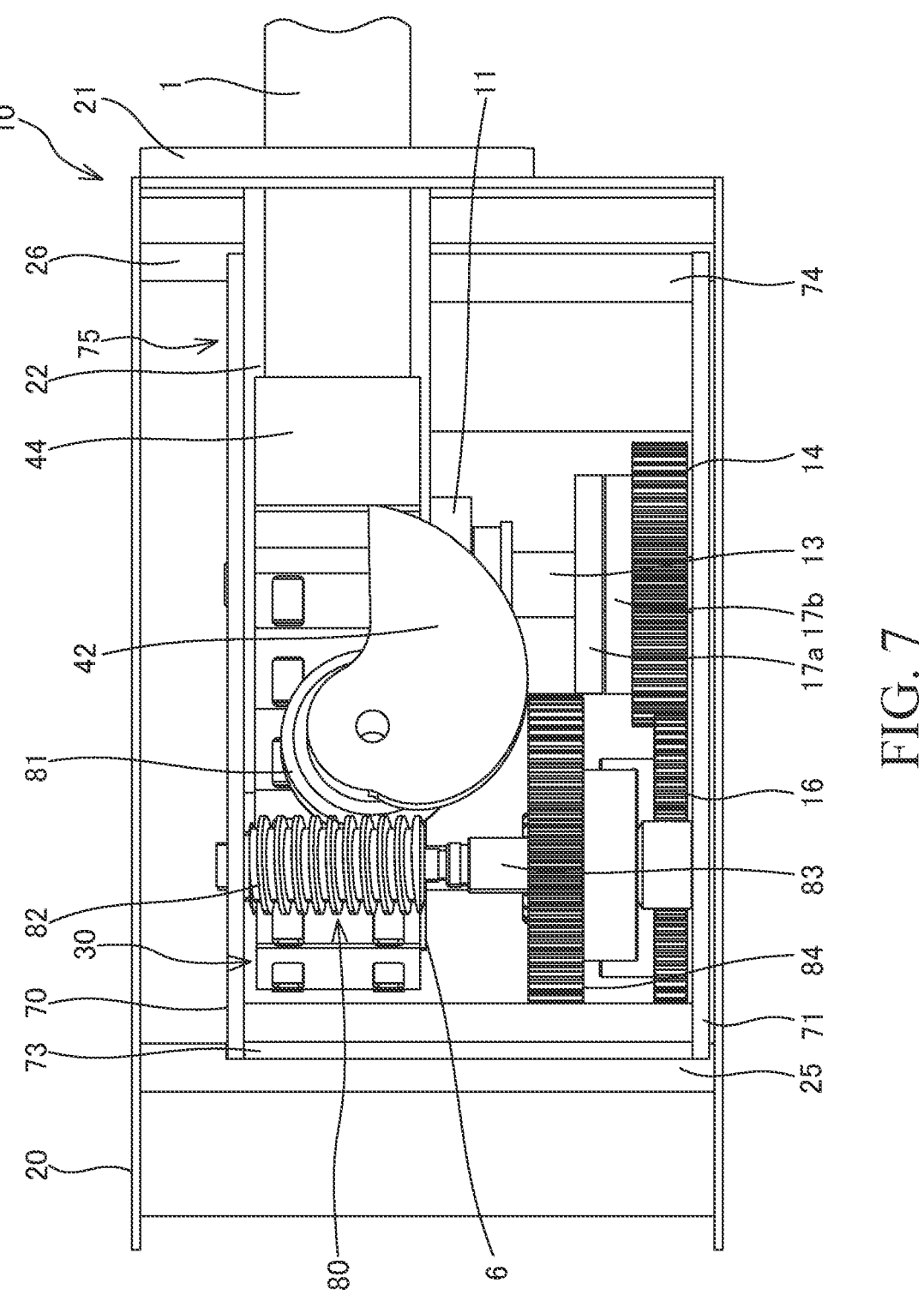
FIG. 7 is a bottom view of the tape driving device of the extension and contraction device according to the embodiment of the present invention.
Figure 8:
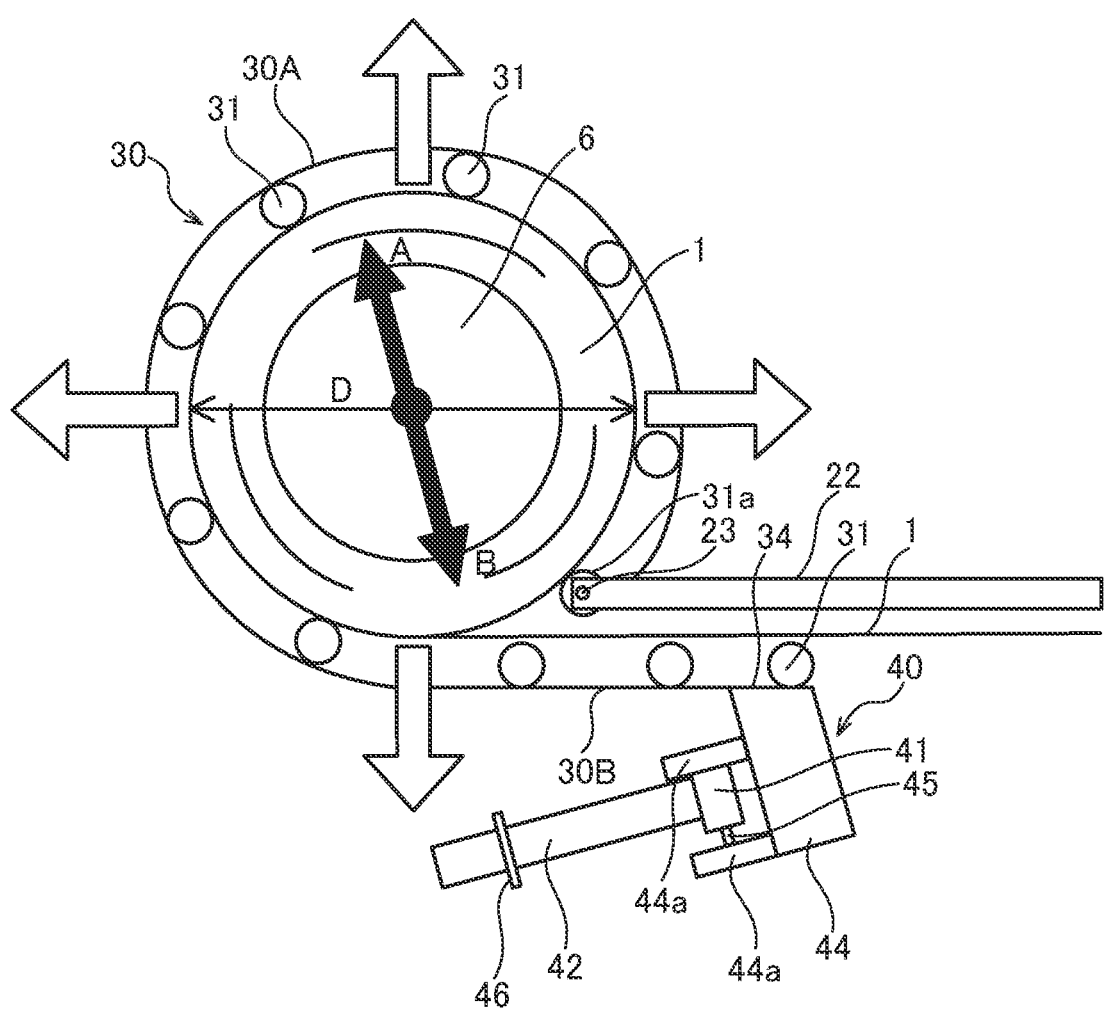
FIG. 8 is a schematic view of a belt and a tension adjusting mechanism.

Next, the tape driving device 10 will be described in detail with main reference to FIGS. 5 to 8. The reel 6, the motor 11, the transmission mechanism 12, the belt 30, and the tension adjusting mechanism 40, which are the components of the tape driving device 10, are accommodated in the housing 20 having a cuboid shape. FIG. 5 is a plan view of the tape driving device 10, FIG. 6 is a side view of the tape driving device 10, FIG. 7 is a bottom view of the tape driving device 10, and FIG. 8 is a schematic view of the belt 30 and the tension adjusting mechanism 40. FIGS. 5 to 7 each shows a state in which a part of faces of the housing 20 is opened such that the inside of the housing 20 can be seen.

As shown in FIG. 5, the rotation shaft 15 that links the reel 6 and the driven gear 16 is rotatably supported across a pair of support plates 70 and 71 that are provided in parallel with each other. In addition, similarly, the rotation shaft 13 that links the motor 11 and the driving gear 14 is rotatably supported across the pair of support plates 70 and 71. In FIG. 6, illustration of the support plate 70 of the pair of support plates 70 and 71 is omitted.

The rotation shaft 13 is divided into a motor shaft 13a that is a rotation shaft of the motor 11 and is rotatably supported by the support plate 70 and a gear shaft 13b that is a rotation shaft of the driving gear 14 and is rotatably supported by the support plate 71. The motor shaft 13a is coupled with the gear shaft 13b by a non-contacting coupling of a magnetic type. In this embodiment, the non-contacting coupling is formed of neodymium magnets 17a and 17b with a high transmission torque. A gap is formed between the neodymium magnet 17a that is attached to an end portion of the motor shaft 13a and the neodymium magnet 17b that is attached to an end portion of the gear shaft 13b. By arranging a barrier material such as Teflon® sheet, etc. in such a gap, it is possible to achieve a water-tight structure for a space in which the motor 11 is arranged. Such a configuration allows the extension and contraction device 100 to be used in a submerged state in water.

The tape guide 21 is provided at the housing 20, and the tape 1 enters and exits the housing 20 through the tape guide 21. An end portion of the tape 1 is attached to an outer circumferential surface of the reel 6, and as the motor 11 is driven and the reel 6 is rotated, the winding up of the tape 1 onto the reel 6 and the delivery of the tape 1 from the reel 6 are performed. FIG. 6 shows a state in which the tape 1 is not attached to the reel 6.

As described above, because the tape 1 has an large elastic force, the tape 1 that has been wound around the reel 6 in the roll shape is subjected to a force that causes the tape 1 to return to the straight shape, which is its original shape, by making it to expand in the radial direction as shown by white arrows in FIG. 8. Therefore, in a state in which the tape 1 is wound around the reel 6 in the roll shape, the tape 1 is easily be "unwound" such that a state in which the layers of the tape 1 are in contact with each other is not maintained, and gaps are formed between the layers of the tape 1. As a countermeasure for the unwinding of the tape 1, the tape driving device 10 has the belt 30 that presses the tape 1 wound around the reel 6 in the roll shape against the reel 6 and the tension adjusting mechanism 40 that adjusts the tension of the belt 30.

As shown in FIGS. 6 and 8, the belt 30 has a plurality of pieces each formed of rollers 31 and a roller support part 32 that rotatably supports the rollers 31, and so, the belt 30 is a bendable belt with the rollers that is formed by linking the plurality of pieces so as to be rotatable with each other. The belt 30 has a curved portion 30A that is provided along an outer circumferential surface of the tape 1 that is wound around the reel 6 in the roll shape and a straight portion 30B that guides the tape 1 extending from the reel 6 in the straight shape. The curved portion 30A of the belt 30 is provided so as to be bent along the outer circumferential surface of the tape 1 that is wound around the reel 6 in the roll shape, thereby surrounding the outer circumferential surface of the tape 1. The tension of the belt 30 is applied to the tape 1 via the rollers 31 of the curved portion 30A. Therefore, even in a state in which the tension is applied by the belt 30 to the outer circumferential surface of the tape 1 that is wound around the reel 6 in the roll shape, the tape 1 is guided by the plurality of rotatable rollers 31, and thus, the winding up of the tape 1 onto the reel 6 and the delivery of the tape 1 from the reel 6 are performed smoothly.

A belt guide 22 is provided at the housing 20 so as to extend along the straight portion 30B of the belt 30. An end portion of the curved portion 30A that is a first end side of the belt 30 is constrained by being fixed to the belt guide 22. In addition, an end portion of the straight portion 30B that is a second end side of the belt 30 is a freely movable free end 34. Because the end portion of the belt 30 is constrained by the belt guide 22, by regulating a position of the free end 34 of the belt 30 by the tension adjusting mechanism 40, it is possible to adjust the tension of the belt 30.

As the tape 1 is wound up by the reel 6, the diameter D of the tape 1 having the roll shape that has been wound around the reel 6 (see FIG. 8) is increased. In the following, the tape 1 having the roll shape that has been wound around the reel 6 is referred to as the "roll-shaped tape 1". When the reel 6 is rotated by one rotation and the tape 1 is wound up by an amount corresponding to a single turn, if the thickness of the tape 1 is T, then the diameter D of the roll-shaped tape 1 is increased by 2T. On the other hand, when the reel 6 delivers the tape 1, the diameter D of the roll-shaped tape 1 is reduced. When the reel 6 is rotated by one rotation and the tape 1 is delivered by an amount corresponding to a single turn, the diameter D of the roll-shaped tape 1 is reduced by 2T. If the inner diameter of the curved portion 30A of the belt 30 is not changed while the reel 6 winds up the tape 1 and the diameter D of the roll-shaped tape 1 is increased, the tension of the belt 30 becomes excessively large. On the other hand, if the inner diameter of the curved portion 30A of the belt 30 is not changed while the reel 6 delivers the tape 1 and the diameter D of the roll-shaped tape 1 is reduced, the tension of the belt 30 becomes excessively small, thereby causing the unwinding. As described above, as the winding up and the delivery of the tape 1 are performed by the reel 6, the wound amount of the tape 1 by the reel 6 is changed to change the diameter D of the roll-shaped tape 1, and so, it is required to adjust the tension of the belt 30 by changing the inner diameter of the curved portion 30A of the belt 30 in response to the change in the diameter D of the roll-shaped tape 1. The tension adjusting mechanism 40 adjusts the tension of the belt 30 by changing the inner diameter of the curved portion 30A by regulating the position of the free end 34 of the belt 30 in response to the wound amount of the tape 1 by the reel 6. Specifically, the tension adjusting mechanism 40 performs the adjustment such that the tension of the belt 30 is made substantially constant in response to the wound amount of the tape 1 by the reel 6.

In the following, the tension adjusting mechanism 40 will be described in detail with main reference to FIGS. 6 to 8. The tension adjusting mechanism 40 has a cam follower 41 serving as a receiving part that is provided at the side of the free end 34 of the belt 30, a cam 42 that comes into contact with the cam follower 41 and defines the position of the free end 34 of the belt 30, and a cam driving mechanism 80 that rotates the cam 42 in synchronization with the rotation of the reel 6 to maintain the contact between the cam 42 and the cam follower 41.

The cam follower 41 is attached to the end portion of the straight portion 30B of the belt 30 via a jig 44. The cam follower 41 is a columnar roller and is provided so as to be rotatable about a rotation shaft 45.

The cam 42 is provided so as to be rotatable about a rotation shaft 46. The rotation shaft 46 is supported by a cam support plate 72 (see FIG. 6) that is fixed to the support plate 70. A cam shape of the cam 42 that comes into contact with the cam follower 41 is set such that the tension of the belt 30 is made substantially constant in response to the wound amount of the tape 1 by the reel 6. In FIG. 7, illustration of the cam support plate 72 is omitted.

The cam driving mechanism 80 has a worm wheel 81 that is formed integrally with the cam 42, a worm gear 82 that meshes with the worm wheel 81, a gear 84 that is attached to a rotation shaft 83 of the worm gear 82, and a gear 85 that is attached to the rotation shaft 15 of the reel 6 and meshes with the gear 84 (see FIG. 5). The rotation of the reel 6 is transmitted to the cam 42 via the gear 85, the gear 84, the worm gear 82, and the worm wheel 81. As described above, by the action of the cam driving mechanism 80, the cam 42 is rotated in synchronization with the rotation of the reel 6.

When the diameter D of the roll-shaped tape 1 is increased as the reel 6 is rotated and winds up the tape 1, the free end 34 of the belt 30 is moved in the direction approaching the reel 6 (in the left direction in FIG. 8). In synchronization with this, the cam 42 is also rotated (rotated in the counterclockwise direction in FIG. 7), thereby maintaining the contact between the cam 42 and the cam follower 41. Because the cam shape of the cam 42 is set such that the tension of the belt 30 is made substantially constant in response to the wound amount of the tape 1 by the reel 6, the tension of the belt 30 is prevented from becoming excessively large.

On the other hand, when the diameter D of the roll-shaped tape 1 is reduced as the reel 6 is rotated and delivers the tape 1, the cam 42 is also rotated in synchronization with the rotation of the reel 6 (rotated in the clockwise direction in FIG. 7) such that the free end 34 of the belt 30 is moved in the direction away from the reel 6 (in the right direction in FIG. 8), thereby maintaining the contact between the cam 42 and the cam follower 41. Because the cam shape of the cam 42 is set such that the tension of the belt 30 is made substantially constant in response to the wound amount of the tape 1 by the reel 6, the tension of the belt 30 is prevented from becoming excessively small.

As described above, because substantially constant tension is always applied to the belt 30 by the action of the cam 42, the unwinding of the tape 1 that has been wounded around the reel 6 is prevented.

FIG. 7 shows a state in which the free end 34 of the belt 30 has moved away from the reel 6 to its maximum extent, and the cam 42 has been rotated in the clockwise direction to its maximum extent. This state corresponds to the most-extended state (the state shown in FIG. 1) in which the tape 1 has been delivered from the reel 6, and the extension/contraction portion 4 has been most extended. When the reel 6 winds up the tape 1 from the state shown in FIG. 7, the free end 34 of the belt 30 is moved in the left direction in FIG. 7 and the cam 42 is rotated in the counterclockwise direction, and when a state in which the extension/contraction portion 4 is most-contracted (the state shown in FIG. 2) is achieved, the cam 42 has rotated by about 180 degrees from the state shown in FIG. 7.

As described above, in addition to the function of preventing the unwinding of the tape 1 that has been wound around the reel 6, the belt 30 also has a function of deforming the tape 1, which is to be wound around the reel 6, from the arc-shaped cross-section to the rectangular cross-section so as to wind the tape 1 around the reel 6. Because the tape 1 to be wound around the reel 6 is wound around the reel 6 in the substantially flat state with the rectangular cross-section with the tension of the belt 30, the tape 1 can be stably wound around the reel 6 in the roll shape. As described above, the tension of the belt 30 acts so as to prevent the unwinding of the tape 1 and to deform the tape 1 to have the rectangular cross-section, and so, the belt 30 has two functions. Thus, the number of components is reduced, and simplification of the structure is achieved.

The tape driving device 10 has a configuration in which the reel 6, etc. can move relative to the housing 20 in response to the change in the diameter D of the roll-shaped tape 1 in response to the wound amount of the tape 1 by the reel 6. This configuration will be described below.

As described above, the end portion of the curved portion 30A that is the first end side of the belt 30 is constrained by being fixed to the belt guide 22. Specifically, as shown in FIGS. 6 and 8, among the plurality of rollers 31 of the belt 30, the rollers 31a provided on the end portion are rotatably attached to a rotation shaft 23 that is provided on a tip end of the belt guide 22. In other words, the rollers 31a of the end portion of the belt 30 are constrained by the belt guide 22 and is unmovable.

As shown in FIG. 6, in a state in which the tape 1 is not wound around the reel 6, the outer circumferential surface of the reel 6 is in contact with the rollers 31*a* of the belt 30. Because the rollers 31*a* of the belt 30 are constrained by the belt guide 22, the reel 6 is configured so as to be movable as the tape 1 is wound up. Specifically, as the reel 6 winds up the tape 1, the reel 6 receives the reaction force from the rollers 31*a* of the belt 30 that are constrained by the belt guide 22 and is moved in the direction away from the rollers 31*a*. In addition, as the reel 6 delivers the tape 1, the reel 6 is moved in the direction approaching the rollers 31*a*. A detailed description will be provided below.

As described above, the reel 6 and the rotation shaft 15 of the driven gear 16 are supported across the pair of support plates 70 and 71, and the motor 11 and the rotation shaft 13 of the driving gear 14 are also supported across the pair of support plates 70 and 71. In addition, the worm gear 82 and the rotation shaft 83 of the gear 84 of the cam driving mechanism 80 (see FIG. 7) are also supported across the pair of support plates 70 and 71. In addition, the cam 42 and the worm wheel 81 are supported via the rotation shaft 46 by the cam support plate 72 that is fixed to the support plate 70 (see FIG. 6).

As shown in FIGS. 5 and 7, the pair of support plates 70 and 71 are fixed by a pair of slide plates 73 and 74 that are provided between the pair of support plates 70 and 71. The support plates 70 and 71, the cam support plate 72, and the slide plates 73 and 74 form a frame 75 serving as a support body that supports the reel 6, the motor 11, the transmission mechanism 12, the cam 42, and the tension adjusting mechanism 40.

As described above, the reel 6, the motor 11, the transmission mechanism 12, the cam 42, and the tension adjusting mechanism 40 are supported by the frame 75 so as to be integrally movable relative to the housing 20. On the other hand, the belt 30 in which the rollers 31*a* are constrained by the belt guide 22 fixed to the housing 20 is unable to be moved relative to the housing 20.

As shown in FIG. 6, guide parts 25 and 26 that guide the movement of the frame 75 are provided at an inner surface of the housing 20. The guide parts 25 and 26 are provided so as to be inclined relative to the belt guide 22. The pair of slide plates 73 and 74 of the frame 75 are respectively provided so as to extend along the guide parts 25 and 26 so as to slide along the guide parts 25 and 26. In the following, the inclination of the guide parts 25 and 26 will be described.

As shown in FIGS. 6 and 8, the tape 1 is guided to the outer circumferential surface of the reel 6 by extending along a gap between the belt guide 22 and the straight portion 30B of the belt 30. The guide parts 25 and 26 are provided so as to be inclined relative to the belt guide 22 such that, as the winding up and the delivery of the tape 1 are performed by the reel 6, the reel 6 can be moved such that the straight portion of the tape 1 between the belt guide 22 and the straight portion 30B of the belt 30 always extend in the tangential direction of the roll-shaped tape 1.

As the reel 6 winds up the tape 1 and the diameter D of the roll-shaped tape 1 is increased, the reel 6 receives the reaction force from the rollers 31*a* of the belt 30 that are constrained by the belt guide 22. As a result, the frame 75 that supports the reel 6, etc. is moved relative to the housing 20 in the direction in which the reel 6 moves away from the rollers 31*a* (in the direction shown by black arrows A in FIGS. 6 and 8) by being guided by the guide parts 25 and 26. On the other hand, as the reel 6 delivers the tape 1 and the diameter D of the roll-shaped tape 1 is reduced, the tension of the belt 30 applied by the tension adjusting mechanism 40, the frame 75 that supports the reel 6, etc. is moved relative to the housing 20 in the direction in which the reel 6 approaches the rollers 31*a* (in the direction shown by black arrows B in FIGS. 6 and 8) by being guided by the guide parts 25 and 26. Because the frame 75 is formed to have a frame shape having the pair of support plates 70 and 71 and the pair of slide plates 73 and 74 and has a high rigidity, the frame 75 stably slides along the guide parts 25 and 26.

As described above, even if the diameter D of the roll-shaped tape 1 is increased/reduced as the reel 6 is rotated, because the frame 75 that supports the reel 6, etc. moves relative to the housing 20 by being guided by the guide parts 25 and 26, the winding up and the delivery of the tape 1 by the reel 6 are performed stably.

Whereas the cam 42 is supported by the frame 75 and is moved together with the frame 75, the cam follower 41 is supported by the belt 30 and is not moved together with the frame 75. Therefore, as the reel 6 is rotated, the cam 42 and the cam follower 41 are displaced relative to each other. As shown in FIGS. 6 and 8, even if the cam 42 and the cam follower 41 are displaced relative to each other, in order to maintain a stable contact state between the cam 42 and the cam follower 41, the cam follower 41 is provided substantially parallel to the moving direction of the frame 75. With such a configuration, even if the cam 42 is moved due to the movement of the frame 75, an orientation in which the cam 42 and the cam follower 41 come into contact with each other is maintained unchanged.

In addition, a pair of restriction plates 44*a* that restrict displacement of the cam 42 relative to the cam follower 41 are provided on the jig 44 that supports the cam follower 41. By providing the pair of restriction plates 44*a*, the contact between the cam 42 and the cam follower 41 is maintained.

An operation of the extension and contraction device 100 configured as described above will be described with main reference to FIGS. 1 and 2.

When the motor 11 is driven in the normal direction and the reel 6 is rotated, the tape 1 is delivered from the reel 6. As a result, the extension/contraction portion 4 is extended (extended in the upward direction in FIG. 1), and the driven object 101 that is attached to the turning device 50 is moved in the upward direction in FIG. 1. In the most extended state of the extension/contraction portion 4 (the state shown in FIG. 1), the strings 9 are fully tensioned over the entirety.

On the other hand, when the motor 11 is driven in the reverse direction and the reel 6 is rotated, the tape 1 is wound around the reel 6. As a result, the extension/contraction portion 4 is contracted (contracted in the downward direction in FIG. 1), the driven object 101 that is attached to the turning device 50 is moved in the downward direction in FIG. 1. The extension/contraction portion 4 is contracted until the most-contracted state (the state shown in FIG. 2), in which the adjacent binding plates 8 come into contact with each other between the case 51 of the turning device 50 and the housing 20 of the tape driving device 10, is achieved. In the most-contracted state of the extension/contraction portion 4, the strings 9 are loosened (illustration of the strings 9 is omitted in FIG. 2). Although a case in which the tape driving device 10 is arranged below the turning device 50 is shown in FIGS. 1 and 2, the orientation of the extension and contraction device 100 is not limited, and the tape driving device 10 may be arranged above the turning device 50.

When the motor 11 is stopped during the delivery of the tape 1 from the reel 6 or during the winding up of the tape 1 onto the reel 6, the reel 6 is maintained in a sopped state, and the driven object 101 is held by the extension/contraction portion 4. The amount of extension/contraction (a stroke) of the extension/contraction portion 4 is controlled on the basis of a detection result from the rotation angle detector built in the motor 11. In addition, the load detector built in the motor 11 detects a load acting on the tape 1, and an overload acting on the tape 1 or the buckling of the tape 1 is determined on the basis of the detection result.

The tension adjusting mechanism 40 performs the adjustment such that the tension of the belt 30 is kept substantially constant in response to the wound amount of the tape 1 by the reel 6. By doing so, the unwinding of the tape 1 that has been wound around the reel 6 is prevented. In addition, as the reel 6 is rotated, the frame 75 that supports the reel 6, etc. is moved relative to the housing 20 by being guided by the guide parts 25 and 26. As a result, the winding up and the delivery of the tape 1 by the reel 6 are performed stably.

Figure 9:
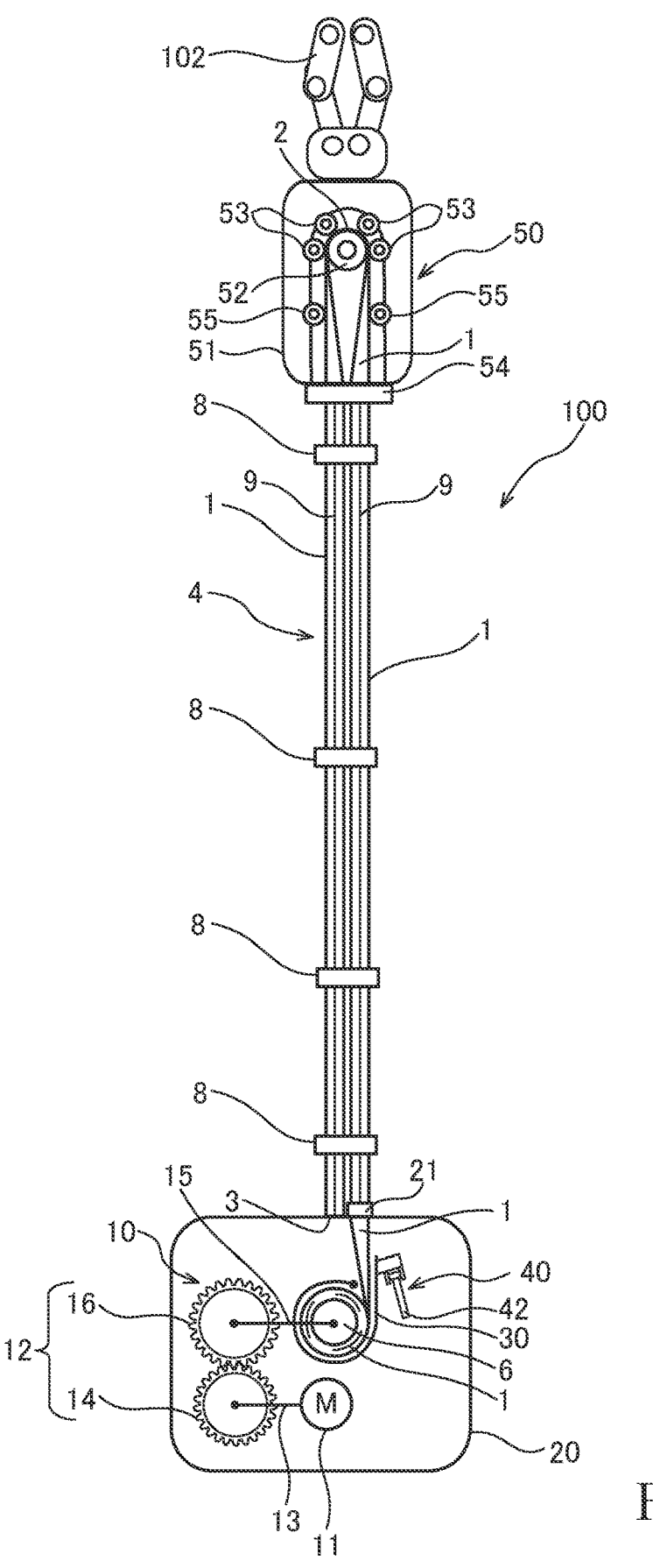
FIG. 9 is a schematic view showing a modification of the extension and contraction device according to the embodiment of the present invention.

The extension and contraction device 100 can be used as an opening/closing device of a top window, an opening/closing device of a door, and a stay for opening/closing a rear hatch of a vehicle. In addition, as shown in FIG. 9, instead of the driven object 101, an attachment such as a hand device 102, etc. capable of being opened and closed may be attached to the turning device 50, and the extension and contraction device 100 may be used as a manipulator.

In addition, by attaching the tape driving device 10 to the body by using a belt, etc. and using the turning device 50 by pushing it against a floor surface or a seat surface of a chair, it is possible to use the extension and contraction device 100 as an electrical crutch for assisting standing up or for holding standing posture. Furthermore, by attaching a plurality of tape driving devices 10 to the body by using the belt, etc. and respectively attaching motor-driven wheels to the turning devices 50, it is possible to use the extension and contraction device 100 for supporting walking. As described above, the extension and contraction device 100 can also be used for life supports.

With the extension and contraction device 100, the stroke of the extension/contraction portion 4 is long and the extension/contraction ratio is high while the extension and contraction device 100 has a compact size when the extension/contraction portion 4 is in the most-contracted state (the state shown in FIG. 2), and at the same time, the rigidity of the extension/contraction portion 4 formed of the tape 1 is high, and therefore, the extension and contraction device 100 can be used for various applications.

Modifications of the above-mentioned embodiment will be described below. The modifications described below also fall within the scope of the present invention. It may be possible to combine the following modifications with the configurations in the above-mentioned embodiment, and it may also be possible to combine the following modifications with each other.

(1) In the above-mentioned embodiment, a description has been given of the configuration in which the cross-sectional shape of the tape 1 in the width direction is the arc shape. However, the cross-sectional shape of the tape 1 is not limited to the arc shape, and it may be rectangular shape, etc.

(2) In the above-mentioned embodiment, a description has been given of the configuration in which the tape 1 has the turned portion 2 and the fixed end 3. Alternatively, the tape 1 may not be turned, and the driven object 101 may be attached to a tip end of the tape 1. In this embodiment, the extension/contraction portion 4 may be formed of a plurality of tapes 1. Specifically, the plurality of layered tapes 1 may be delivered from a single tape driving device 10 at the same time. In addition, the tapes 1 respectively delivered from a plurality of tape driving devices 10 may also be bound together.

Figure 10A:
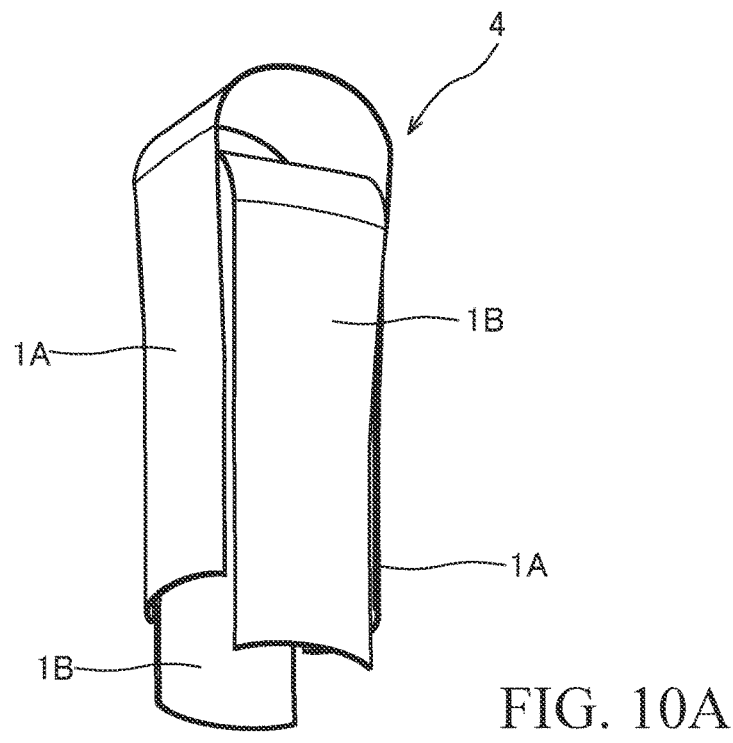
FIG. 10A is a schematic view showing a modification of the extension and contraction device according to the embodiment of the present invention and is a perspective view of a tip end portion of the extension/contraction portion.
Figure 10B:
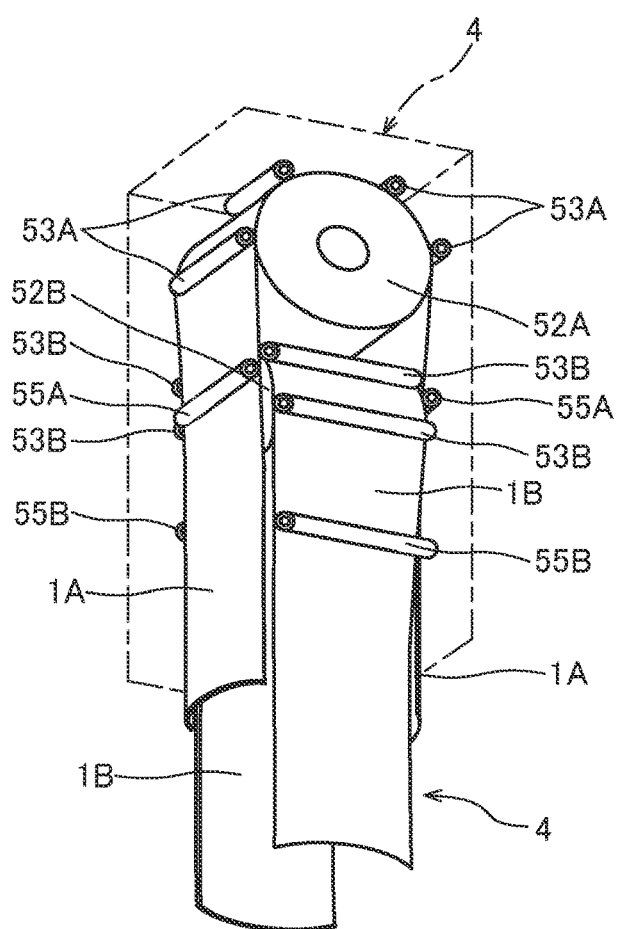
FIG. 10B is a schematic view showing a modification of the extension and contraction device according to the embodiment of the present invention and is a perspective view of a tip end portion of the extension/contraction portion.

(3) In the above-mentioned embodiment, a description has been given of the configuration in which the extension/contraction portion 4 is formed of a single tape 1 that has been turned by 180 degrees. As shown in FIGS. 10A and 10B, two tapes 1A and 1B that are turned by 180 degrees may be arranged at 90 degrees apart from each other such that a cross-section of the extension/contraction portion 4 becomes a substantially cylindrical shape. With such a configuration, it is possible to further increase the rigidity of the extension/contraction portion 4. FIG. 10A is a perspective view of the tip end portion of the extension/contraction portion 4 and shows an embodiment in which the tapes 1A and 1B are turned without using the turning device 50, and FIG. 10B is a perspective view of the tip end portion of the extension/contraction portion 4 and shows an embodiment in which the tapes 1A and 1B are turned by using the turning device 50. In the embodiment shown in FIG. 10B, similarly to the embodiment shown in FIGS. 1 and 2, the direction changing rollers 52A and 52B, the guide rollers 53A and 53B, and the guide rollers 55A and 55B are respectively provided for the tape 1A and the tape 1B in the turning device 50. In FIG. 10B, illustration of faces of the turning device 50 is partially omitted such that an internal configuration of the turning device 50 can be seen.

Figure 11:
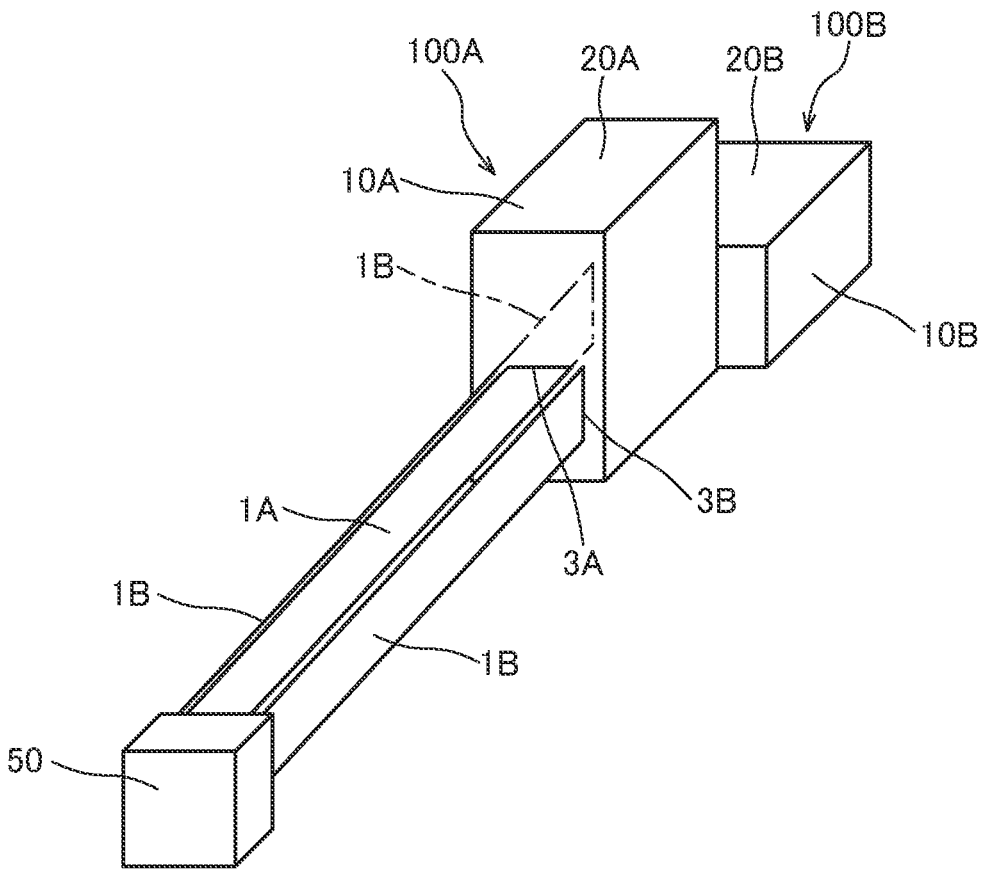
FIG. 11 is a schematic view showing the modification of the extension and contraction device according to the embodiment of the present invention and is a perspective view schematically showing an embodiment in which two extension and contraction devices are connected.

In order to arrange two tapes 1A and 1B, which have been turned by 180 degrees, at 90 degrees apart from each other, for example, as shown in FIG. 11, two extension and contraction devices 100 (100A and 100B) are connected at 90 degrees apart from each other. Specifically, the housings 20A and 20B of the tape driving devices 10A and 10B of the extension and contraction devices 100A and 100B are connected at 90 degrees apart from each other. The tape 1A delivered from the tape driving device 10A of the extension and contraction device 100A is turned at the turning device 50, and the tail end 3A is fixed to the housing 20A of the tape driving device 10A. On the other hand, the tape 1B delivered from the tape driving device 10B of the extension and contraction device 100B passes through the inside of the housing 20A of the tape driving device 10A and is turned at the turning device 50, and the tail end 3B is fixed to the housing 20A. The tape 1B delivered from the tape driving device 10B extends along the support plate 70 (shown in FIG. 5) in the housing 20A, thereby passing through the inside of the housing 20A.

As shown in FIGS. 10A, 10B and 11, when the two tapes 1A and 1B are used, by performing the control such that the two tapes 1A and 1B respectively have different extending and contracting speeds, it is possible to generate a tensile force between the two tapes 1A and 1B at the tip end of the extension/contraction portion 4. The tensile force can be used, for example, for a grasping force of the hand device 102 (see FIG. 9) or for a braking force for the wheel attached to the turning device 50.

(4) In the above-mentioned embodiment, a description has been given of the configuration in which the band member that presses the tape 1 wound around the reel 6 in the roll shape against the reel 6 is the belt 30. However, as the band member, it suffices that the band member can press the tape 1 against the reel 6, and for example, a chain may be employed instead of the belt 30.

(5) In the above-mentioned embodiment, a description has been given of the configuration in which the tension adjusting mechanism 40 has the cam follower 41 and the cam 42. However, the tension adjusting mechanism 40 is not limited to this embodiment, and it suffices that the tension adjusting mechanism 40 has a configuration in which the tension of the belt 30 can be adjusted by regulating the position of the free end 34 of the belt 30, and for example, the tension adjusting mechanism 40 may have an embodiment in which the position of the free end 34 of the belt 30 is regulated by a motor in synchronization with the rotation of the reel 6.

(6) In the above-mentioned embodiment, a description has been given of the configuration in which the motor 11 is the servomotor, and the rotation angle detector and the load detector are incorporated in the motor 11. Alternatively, the tape guide 21 of the housing 20 and the tape guide 54 of the turning device 50 may include a stroke sensor that detects the amount of extension/contraction (the stroke) of the extension/contraction portion 4 by detecting the delivered amount and the wound amount of the tape 1. In addition, a load detector that detects a load acting on the tape 1 may be provided between the fixed end 3 of the tape 1 and the housing 20.

Figure 12:
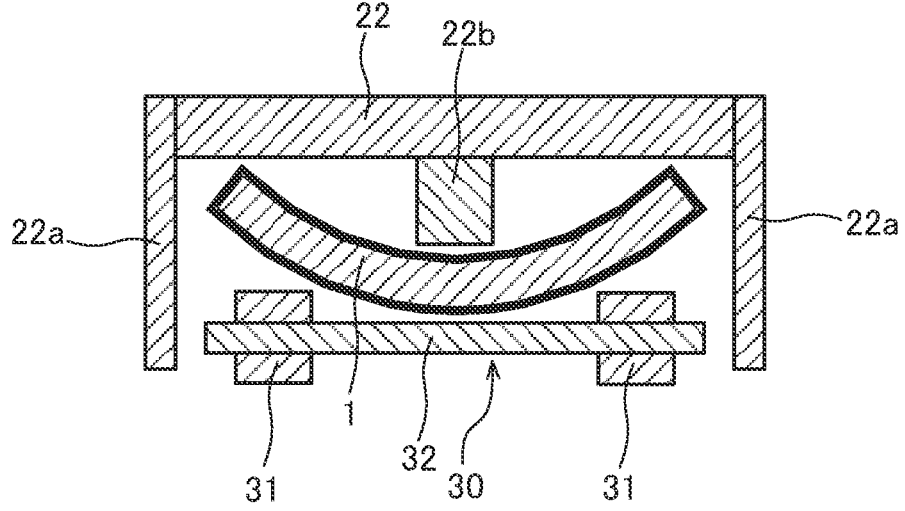
FIG. 12 is a schematic view showing a modification of the extension and contraction device according to the embodiment of the present invention and is a cross-sectional view of a vicinity of a belt guide.

(7) As shown in FIG. 12, wall portions 22a that receive the straight portion of the tape 1 and the straight portion 30B of the belt 30 may be provided on both side portions of the belt guide 22. With such a configuration, the straight portion of the tape 1 and the straight portion 30B of the belt 30 can be moved stably along the belt guide 22. In addition, a rotatable roller 22b that guides the movement of the straight portion of the tape 1 may also be provided on a bottom surface of the belt guide 22.

The configurations, operations, and effects of the embodiments of the present invention will be collectively described below.

The extension and contraction device 100 includes: the tape 1 having the elasticity; and the tape driving device 10 configured to perform the winding up of the tape 1 and the delivery of the tape 1, wherein the tape driving device 10 has: the reel 6 around which the tape 1 is wound in the roll shape; the motor 11 (the motive-power source) configured to perform the winding up of the tape 1 onto the reel 6 and the delivery of the tape 1 from the reel 6; the belt 30 (the band member) in which the first end side is constrained and the second end side is the movable free end 34, the belt 30 being provided along the outer circumferential surface of the tape 1 that is wound around the reel 6 in the roll shape, and the belt 30 being configured to press the tape 1 against the reel 6; and the tension adjusting mechanism 40 (tension adjusting means) configured to adjust the tension of the belt 30 by regulating the position of the free end 34 of the belt 30.

With this configuration, because the tension of the belt 30 pressing the tape 1 against the reel 6 is adjusted by the tension adjusting mechanism 40, it is possible to prevent the unwinding of the tape 1.

In addition, the tension adjusting mechanism 40 is configured to adjust the tension of the belt 30 in response to the wound amount of the tape 1 by the reel 6.

With this configuration, because the tension of the belt 30 is adjusted in response to the wound amount of the tape 1, it is possible to prevent the unwinding of the tape 1.

In addition, the tension adjusting mechanism 40 has: the cam follower 41 (the receiving part) provided at the free end 34 side of the belt 30; the cam 42 configured to come into the cam follower 41, the cam 42 being configured to define the position of the free end 34 of the belt 30; and the cam driving mechanism 80 configured to rotate the cam 42 in synchronization with the rotation of the reel 6 such that the contact between the cam 42 and the cam follower 41 is maintained.

With this configuration, because the cam 42 is rotated in synchronization with the rotation of the reel 6 to maintain the contact between the cam 42 and the cam follower 41, the tension of the belt 30 is adjusted in response to the wound amount of the tape 1. Thus, it is possible to prevent the unwinding of the tape 1.

In addition, the cam shape of the cam 42 is set such that the tension of the belt 30 is made substantially constant in response to the wound amount of the tape 1 by the reel 6.

With this configuration, because the cam shape is set such that the tension of the belt 30 is made substantially constant in response to the wound amount of the tape 1, it is possible to prevent the unwinding of the tape 1.

In addition, the tape driving device 10 further includes: the housing 20 configured to accommodate the reel 6 and the motor 11, the housing 20 being provided with the entrance and exit of the tape 1; the frame 75 (the support body) configured to support the reel 6; and the guide parts 25 and 26 provided at the housing 20, the guide parts 25 and 26 being configured to guide the movement of the frame 75, and wherein the frame 75 is configured to be moved relatively to the housing 20 by being guided by the guide parts 25 and 26 as the reel 6 is rotated.

With this configuration, even if the diameter D of the roll-shaped tape 1 that is wound around the reel 6 is increased/reduced as the reel 6 is rotated, the frame 75 supporting the reel 6 is moved relative to the housing 20 by being guided by the guide parts 25 and 26, and so, the winding up and the delivery of the tape 1 by the reel 6 are performed stably.

In addition, the belt 30 has: the curved portion 30A provided along the outer circumferential surface of the tape 1 that is wound around the reel 6 in the roll shape; and the straight portion 30B configured to guide the tape 1 extending from the reel 6 in the straight shape, the belt guide 22 serving as a band guide is provided at the housing 20 so as to extend along the straight portion 30B of the belt 30, and the end portion of the curved portion 30A of the belt 30 is constrained by the belt guide 22.

With this configuration, because the end portion of the curved portion 30A of the belt 30 is constrained by the belt guide 22, it is possible to adjust the tension of the belt 30 by regulating the position of the free end 34 of the belt 30 by the tension adjusting mechanism 40.

In addition, the tape 1 has the strip shape formed to have the arc-shaped cross-section perpendicular to the longitudinal direction, the tape 1 being wound around the reel 6 in the roll shape by being deformed by the tension of the belt 30 such that the cross-section has a substantially rectangular shape.

With this configuration, because the belt 30 has a function of deforming the tape 1 to have the substantially rectangular cross-section in addition to the function of preventing the unwinding of the tape 1, the number of components is reduced, and simplification of the structure is achieved.

Embodiments of this invention were described above, but the above embodiments are merely examples of applications of this invention, and the technical scope of this invention is not limited to the specific constitutions of the above embodiments.

This application claims priority based on Japanese Patent Application No. 2021-73464 filed with the Japan Patent Office on Apr. 23, 2021, the entire contents of which are incorporated into this specification.

The invention claimed is:

1. An extension and contraction device comprising:

a tape having an elasticity; and a tape driving device configured to perform winding up of the tape and delivery of the tape, wherein the tape driving device has:

a reel around which the tape is wound in a roll shape;

a motive-power source configured to perform the winding up of the tape onto the reel and the delivery of the tape from the reel;

a band member in which a first end side is constrained and a second end side is a movable free end, the band member being provided along an outer circumferential surface of the tape wound around the reel in the roll shape, and the band member being configured to press the tape against the reel;

tension adjusting mechanism configured to adjust tension of the band member by regulating a position of the free end of the band member;

a housing configured to accommodate the reel and the motive-power source, the housing being provided with an entrance and exit of the tape;

a support body configured to support the reel; and a guide part provided at the housing, the guide part being configured to guide movement of the support body, wherein the support body is configured to be moved relative to the housing by being guided by the guide part as the reel is rotated.

2. The extension and contraction device according to claim 1, wherein the tension adjusting mechanism is configured to adjust the tension of the band member in response to a wound amount of the tape by the reel.

3. The extension and contraction device according to claim 1, wherein the tension adjusting mechanism has:

a receiving part provided at the free end side of the band member;

a cam configured to come into contact with the receiving part, the cam being configured to define the position of the free end of the band member; and a cam driving mechanism configured to rotate the cam in synchronization with rotation of the reel such that the contact between the cam and the receiving part is maintained.

4. The extension and contraction device according to claim 3, wherein a cam shape of the cam is set such that the tension of the band member becomes substantially constant in response to a wound amount of the tape by the reel.

5. The extension and contraction device according to claim 1, wherein the band member has: a curved portion provided along the outer circumferential surface of the tape wound around the reel in the roll shape; and a straight portion configured to guide the tape extending from the reel in a straight shape, a band guide is provided at the housing so as to extend along the straight portion of the band member, and an end portion of the curved portion of the band member is constrained by the band guide.

6. The extension and contraction device according to claim 1, wherein the tape has a strip shape formed to have an arc-shaped cross-section perpendicular to a longitudinal direction, the tape being wound around the reel in the roll shape by being deformed by the tension of the band member such that the cross-section has a substantially rectangular shape.

* * * * *